Nov. 10, 1931.  N. W. STORER  1,831,044
MOTOR GENERATOR TYPE LOCOMOTIVE
Filed Jan. 5, 1929   2 Sheets-Sheet 2
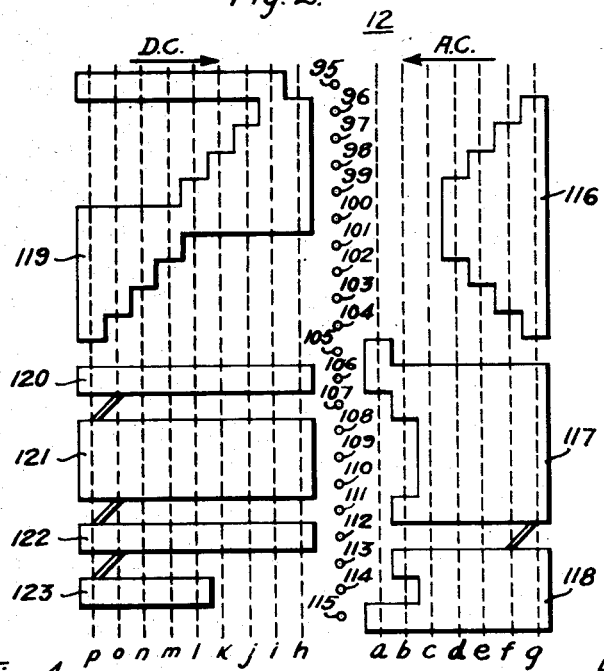
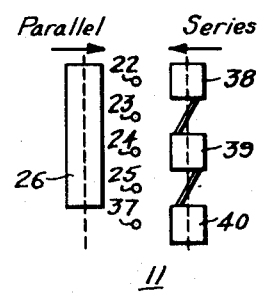
INVENTOR
Norman W. Storer.
BY
ATTORNEY Patented Nov. 10, 1931

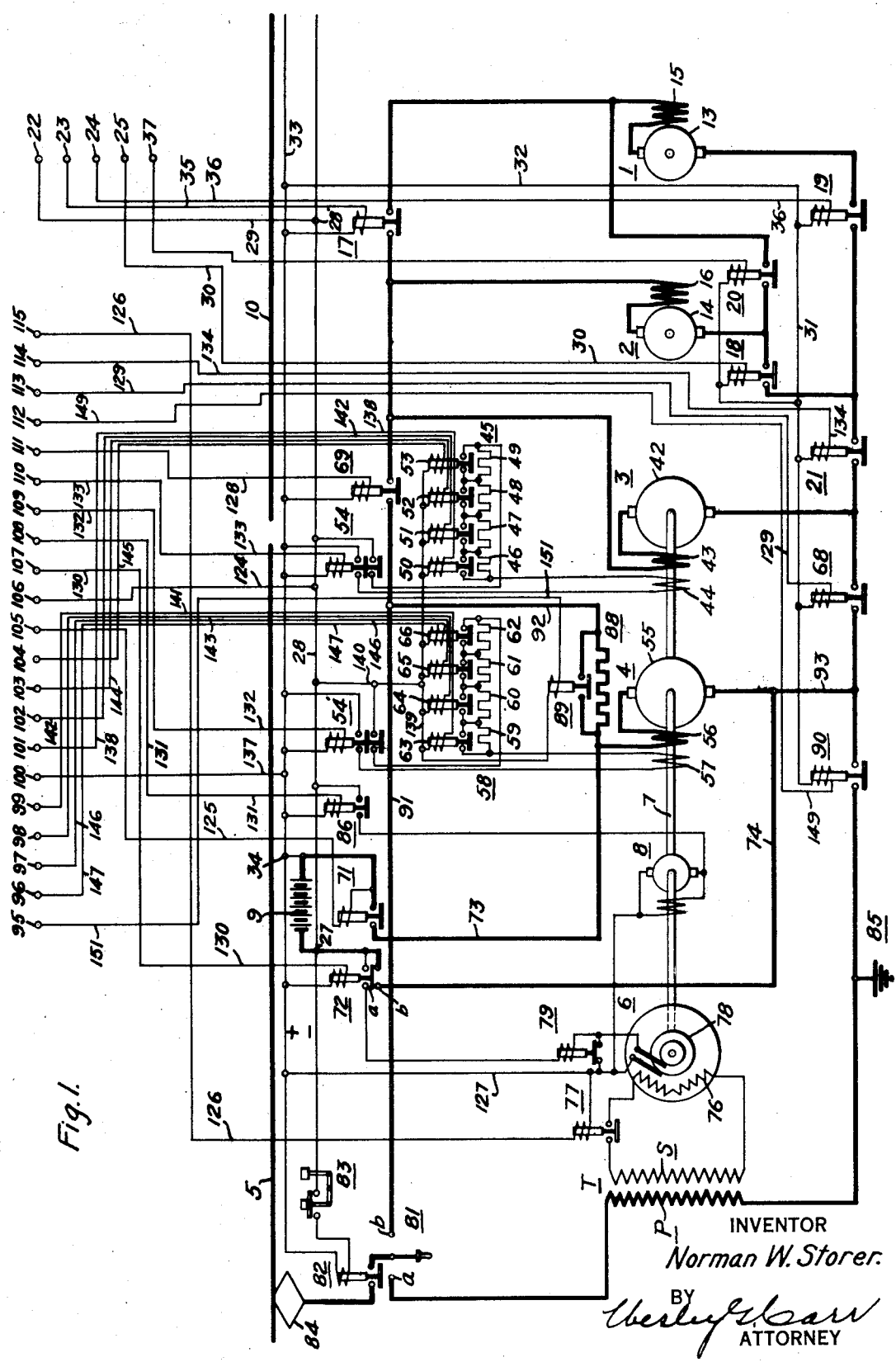

1,831,044

UNITED STATES PATENT OFFICE

NORMAN W. STORER, OF PITTSBURGH, PENNSYLVANIA, ASSIGNOR TO WESTINGHOUSE ELECTRIC & MANUFACTURING COMPANY, A CORPORATION OF PENNSYLVANIA

MOTOR-GENERATOR-TYPE LOCOMOTIVE

Application filed January 5, 1929. Serial No. 330,595.

This invention relates to motor-propelled vehicles and particularly to motor-generator locomotives.

An object of this invention is to provide a motor-generator-type locomotive that shall be simple in construction, efficient in operation and easily manufactured and installed.

Another object of the invention is the provision of means for supplying direct-current power to the traction motors of a motor vehicle, irrespective of whether the power supply is direct current or alternating current.

A further object of the invention is the provision of means for utilizing a plurality of direct-current generators, disposed for operation by an alternating-current motor, for supplying direct-current power to the traction motors of a motor vehicle when the vehicle is operating over a track-section having an alternating-current power supply and the utilization of one or more of said generators as motors to drive the other of said generators when the vehicle is operating over a track-section provided with a direct-current power supply, whereby said traction motors may be supplied with direct-current power continuously.

Other objects and novel features of the invention will be apparent from the specification, when considered in connection with the accompanying drawings, in which;

Figure 1 is a diagrammatic view of circuits and apparatus, embodied in a motor vehicle (not shown), arranged in accordance with this invention.

Fig. 2 is a development of a drum controller for governing the operation of the apparatus shown in Fig. 1, when the vehicle is operating on a track-section supplied with either alternating-current or direct-current power.

Fig. 3 is a development of a series-parallel drum controller.

Fig. 4 is a sequence chart giving the sequence of operation of switches controlled by the direct-current section of the drum controller shown in Fig. 2.

Fig. 5 is a sequence chart giving the sequence of operation of switches controlled by the alternating-current section of the drum controller shown in Fig. 2, and Fig. 6 is a sequence chart showing the circuit-controlling positions of switches, governing the series-parallel connections of traction motors illustrated in Fig. 1, as controlled by the drum controller shown in Fig. 6.

In the embodiment of the invention shown in the drawing, a vehicle (not shown) is provided with traction motors 1 and 2, preferably of the series type, that may be supplied with direct-current power from a source comprising a plurality of variable-voltage, direct-current dynamo-electric machines 3 and 4, preferably of the compound-wound type. The speed of the motors 1 and 2 may be controlled by varying the voltage of the machines 3 and 4.

When the vehicle (not shown) is operating on a track section supplied with alternating-current power, as from a single-phase trolley 5, the machines 3 and 4 may be driven by a single-phase synchronous motor 6. The motor 6 and the dynamos 3 and 4 may be mechanically coupled in any suitable or well known manner to a shaft 7. It is to be noted also that an exciter generator 8 is coupled to the shaft 7 for the purpose of charging a storage battery 9 and supplying direct-current power to certain field windings of the dynamo-electric machines 3 and 4 and control apparatus to be hereinafter set forth.

The motor 6 may be connected to a secondary winding S of a transformer T having also a primary winding P disposed to be connected to the single-phase trolley 5, in a manner to be hereinafter set forth.

In order that the vehicle may be operated over a track section supplied with direct-current power, as from a direct-current trolley 10, provision is made for connecting one of the dynamo-electric machines, as, for example, the machine 4, to the trolley 10 for operation as a direct-current motor to drive dynamo 3 as a generator. The motors 1 and 2 will then be supplied with direct-current power from the dynamo 3 only.

If the motors 1 and 2 are connected in parallel-circuit relation to the machine 3 when the machine 4 is operating as a motor, the traction motors will develop full tractive effort at full running speed but the dynamos 3 and 4 will be subject to approximately 100 per cent overload. Such an overload may be permissible if the direct-current track section is relatively short because the dynamos 3 and 4 will not be operated at this overload for a very long period of time. However, if the direct-current track section is relatively long, the dynamos 3 and 4 may be subjected to the overload for too long a period of time, therefore, provision is made for connecting the traction motors 1 and 2 in series-circuit relation across the dynamos 3. The machine 3 will then supply only full-load current to the traction motors, each motor operating at approximately one-half voltage but developing full tractive effort at approximately one-half speed.

The series-parallel connection of the motors 1 and 2 may be effected by a series-parallel drum controller 11 (see Fig. 3), and control apparatus to be hereinafter set forth in detail.

In order that the operation of the motor vehicle may be controlled when operating over either the direct-current or the alternating-current track sections, a drum controller 12 (see Fig. 2) is provided for governing the sequence of operation of control switches, provided for establishing the proper circuit connections for the dynamo-electric machines 3 and 4 and the alternating-current motor 6, to be later described in detail.

The motors 1 and 2 comprise armatures 13 and 14 and series field windings 15 and 16, respectively. In order to connect the motors in parallel-circuit relation, electro-magnetic switches 17, 18 and 19 are provided, and, to establish series-circuit connections for the motors, an additional electro-magnetic switch 20 is provided.

The motors 1 and 2, when connected for operation in either series or parallel-circuit relation may, by means of the controller 12, be connected to or disconnected from the dynamo-electric machines 3 and 4 by means of an electro-magnetically operable switch 21. If the series-parallel drum controller is actuated to its parallel position; that is, to the right, as viewed in Fig. 3, contact fingers 22 to 25, inclusive, are bridged by a contact segment 26 of the controller, and energizing circuits for the actuating coils of the switches 17, 18 and 19 be thus established.

The energizing circuit for the actuating coil of the switch 18 may be traced from the negative terminal 27 of the battery 9, through conductor 28, junction point 28', conductor 29, contact fingers 22 and 25, bridged by the contact segment 26, conductor 30, the actuating coil of the switch 18 and conductors 31, 32 and 33, to the positive terminal 34 of the battery 9. Similarly, the circuits for the actuating coils of the switches 17 and 19 may be traced from junction point 28', through the contact fingers 23 and 24, respectively, conductors 35 and 36, respectively, the coils of the switches 17 and 19 and conductors 32 and 33, to the positive terminal 34 of the battery 9. When the switches 17, 18 and 19 have been closed, the motors 1 and 2 are disposed for parallel operation.

If the series-parallel drum controller 11 is actuated to the series position; that is, when actuated to the left, as viewed in Fig. 3, the contact fingers 22, 24 and the contact finger 37 are bridged by contact segments 38, 39 and 40 of the controller. The coils of the switches 17 and 18 are deenergized and stand in their open-circuit positions, but the energizing circuits for the actuating coils of the switches 20 and 19 are established. When the coils of the switches 19 and 20 have been energized to actuate them to their circuit-closing positions and the switch 21 has been closed, the motors 1 and 2 will be connected in series-circuit relation to the dynamos 3 and 4 connected in parallel-circuit relation or to the dynamo 3 when the latter is operated as a generator.

The dynamo-electric machine 3 comprises an armature 42, a series field winding 43 and a separately excited field winding 44. The field winding 44 may be connected in series-circuit relation to a resistor 45 having sections 46 to 49, inclusive and across the conductors 28 and 33 that are connected to the battery 9. In order to vary the field strength of the field winding 44, the sections 46 to 49, inclusive, of the resistor 45 are provided with electromagnetic switches 50 to 53, inclusive, which are provided for shunting or short-circuiting the said sections of the resistor. The sequence of operation of these switches may be controlled by the drum controller 12.

The field winding 44 may be disconnected from the conductors 28 and 33 by means of an electro-magnetic switch 54 the operation of which is controlled by the drum controller 12.

The dynamo-electric machine 4 comprises an armature 55, a series field winding 56 and a separately excited field winding 57. The field winding 57 is connected in series-circuit relation with a resistor 58 across the supply conductors 28 and 33 of the battery 9. As shown, the resistor 58 is divided into sections 59 to 62, inclusive.

In order to vary the voltage impressed upon the field winding 57 and thereby to vary its field strength, electro-magnetic switches 63 to 66, inclusive, are provided for short-circuiting the respective sections 59 to 62, inclusive. The sequence and operation of the switches 63 to 66, inclusive, may be controlled by the drum controller 12.

When the vehicle is operating over a track section supplied with alternating-current power, as from the trolley 5, the dynamo-electric machines 3 and 4 may be operated in parallel-circuit relation. To provide for such operation, electro-magnetic switches 68 and 69 are employed for connecting the dynamo-electric machines 3 and 4 in parallel. These switches are also utilized for disconnecting the dynamo 4 from the machine 3 when the former is operating as a motor to drive the latter as a generator.

It is to be borne in mind that, when the vehicle is operating over the track section supplied with alternating-current power, as from the single-phase trolley 5, means must be provided for initiating the staring and acceleration of the single-phase motor 6 to a speed at which it will operate as an induction motor. To initiate such starting and acceleration, provision is made for connecting the dynamo-electric machine 4 to the battery 9 for operation as a motor to drive the single-phase motor 6. The machine 4 may be connected to the battery 9 by means of electro-magnetically operable switches 71 and 72, the switch 72 being provided with top and bottom contact members $a$ and $b$, respectively. When the switch 71 is closed and the contact members $b$ of the switch 72 are closed, the armature 55 and the series field winding 56 are connected in series-circuit relation across the battery 9, and the machine is connected for operation as a motor. The circuit thus established for the machine 4 may be traced from the positive terminal 34 of the battery 9, through the contact members of the switch 71, conductor 73, the field winding 56 and armature 55, conductor 74 and the contact members $b$ of the switch 72, to the negative terminal 27 of the battery 9.

At this point, it will be advantageous to include a description of the single-phase motor 6, together with its operation in connection with the transformer T. The motor 6 comprises a stator winding 76, disposed for connection to the secondary winding S of the transformer T by an electro-magnetically operable switch 77, and a wound rotor winding 78. In order to operate the motor 6 as an induction motor, an electromagnet switch 79 is provided for short-circuiting the terminals of the rotor winding 78. To operate the motor 6 at synchronous speed, provision is made for passing direct current through the rotor winding 78. This is accomplished by closing the contacts $a$ of the switch 72, whereby the switch 79 is opened and the rotor winding 78 is connected across the battery 9 for energization by direct-current power.

To start the motor 6 and cause it to run at synchronous speed, provision is made for connecting the primary winding P of the transformer T to the trolley 5. The means for connecting the primary winding P to the trolley conductor 5 comprises a single-pole double-throw switch 81 having contact members $a$ and $b$ and a circuit breaker 82. For alternating-current operation, the contact members $a$ of the switch 81 are closed, as well as the circuit breaker 82, which is closed by means of a push-button switch 83. When the push-button switch 83 is closed, an energizing circuit for the actuating coil of the circuit breaker 82 is established from the battery 9, whereby the circuit breaker is closed, and an energizing circuit for the primary winding P is established. The circuit for the primary winding P may be traced from the single-phase trolley conductor 5, through a pantograph 84, the circuit breaker 82, the switch 81 and the primary winding P, to ground at 85. When the transformer winding P has been energized, the switch 71, the contact members $b$ of the switch 72, and the switch 77 may be closed. When these switches have been closed, the machine 4 is connected across the battery for operation as a motor, and the stator winding 76 of the motor 6 is energized with alternating current from the secondary winding S of the transformer T. When the speed of the machine 4, operating as a motor, reaches a predetermined value, the motor 6 will operate as an induction motor and its speed will increase almost to synchronous speed. The machine 4 may then be disconnected from the battery by opening the switch 71 and closing the contact members $a$ of the switch 72.

When the contact members $a$ of the switch 72 are closed, the rotor winding 78 will be connected across the battery 9 and energized by direct current. The rotor 78 will then pull into speed and operate at synchronous speed to drive the dynamos 3 and 4 and the exciter 8 as generators.

When the dynamos 3 and 4 are driven by the motor 6 as generators, the switches 68 and 69 may be closed to connect the generators 3 and 4 in parallel. When the machines have been connected in parallel, the switches 54 and 54', 21 and 86 may be closed, thereby connecting the field windings 44 and 57 of the dynamos 3 and 4 and the exciter generator 8 to the battery 9, and the motors 1 and 2 across the generators 3 and 4 for operation as motors to propel the vehicle.

To increase the speed of the vehicle propelled by the motors 1 and 2, the voltage impressed on the motors is increased by operating the switches 50 to 53, inclusive, and 63 to 66, inclusive, so as to increase the voltage impressed on the field windings 44 and 57 of the machines 3 and 4. The sequence of operation of these switches is controlled by the drum controller 12, in a manner to be hereinafter set forth.

When the vehicle is operating over a track section supplied with direct current, as from the direct-current trolley 10, the transformer T is disconnected from the power line by the operation of the switch 81, and provision is made for operating the dynamo 4 as a motor to drive the dynamo 3 as a generator. For direct-current operation, the switch 81 is actuated to the position in which the contact member b is engaged. The circuit breaker 82 may then be closed, and the switches 68 and 69 opened to interrupt the circuit connections between the dynamos 3 and 4.

Before voltage is applied to the motors 1 and 2, the dynamo 4 is preferably accelerated to its full running speed. In order to limit the current flow through the dynamo 4 when it is first connected to trolley 10, a starting resistor 88 and a short-circuiting switch 89 are provided. The resistor 58 and the accelerating switches 63 to 66, inclusive, are utilized for starting and accelerating the dynamo 4 to its full running speed. When the contact members b of the switch 81 have been closed and the circuit breaker 82 also, the switches 63 to 66, inclusive, the switches 86, 54' and the switch 90 are closed, whereby the machine 4 is connected to the trolley conductor 10 and an energizing circuit established. This circuit may be traced from the trolley conductor 10, through the pantograph 84, the circuit breaker 82, contact members b of the switch 81, conductors 91 and 92, the accelerating resistor 88, the field winding 56 and the armature 55 of the machine 4, conductor 93 and the contact members of the switch 90, to ground at 85. To increase the speed of the machine 4, when operating as a motor, the field strength of the field winding 57 thereof is reduced in steps by opening the switches 63 to 66, inclusive, in sequence. The various sections of the resistor 58 are thereby reconnected in series-circuit relation to the field winding 57 in the same sequence.

When the machine 4 is operating at full running speed, the switches 54 and 21 may be closed to connect the field winding 44 across the battery 9, and the motors 1 and 2 across the machine 3 which is now operating as a generator. The speed of the motors may be increased by increasing the voltage developed by the generator 3. This is accomplished by closing the switches 50 to 53, inclusive, in sequence, thereby shunting sections 46 to 49, inclusive, of the resistor 45 to increase the voltage impressed on the motors in a sequence of steps.

The sequence of operation of the switches employed, when operating the vehicle over a section supplied with direct-current, is controlled by the drum controller 12, in a manner to be hereinafter set forth.

The drum controller 12 comprises stationary contact fingers 95 to 115, inclusive, and movable contact segments 116, 117, and 118, and 119, to 123, inclusive. The contact segments 116 to 118, inclusive, of the drum controller 12 are utilized for controlling the operation of the single-phase motor 6 and the machines 3 and 4 when the vehicle is operating over a track section supplied with alternating current, as from the single-phase trolley 5. The segments 119 to 123, inclusive, are utilized for controlling the operation of the dynamo 4 when operating as a motor, and the dynamo 3 when operating as a generator, while the vehicle is operating over a track section supplied with direct-current, as from the trolley 10.

When the vehicle is operating over an alternating-current track section, as from the single-phase trolley 5, and it is desired to start the single-phase motor 6, the alternating-current section of the drum controller 12 is actuated to position a. In this position, contact fingers 105, 106 and 115 are bridged by the segments 117 and 118, to establish energizing circuits for the actuating coils of the switches 71 and 77. The circuit for the actuating coil of the switch 71 may be traced from the negative terminal 27 of the battery 9, through conductor 28, conductor 124 (see Fig. 1), contact fingers 106 and 105—bridged by the contact segment 117—conductor 125 and the actuating coil of the switch 71, to the positive terminal 34 of the battery 9. In this connection, it is to be pointed out that the contact finger 106 may be considered as a junction point because all of the circuits, to be hereinafter traced, controlled by the contact fingers 105 to 115, inclusive, may be traced from this contact finger.

The energizing circuit for the actuating coil of the switch 77 may be traced from the contact finger 106, through contact segments 117 and 118 and the contact finger 115, conductor 126, the actuating coil of the switch 77 and conductor 127, to the positive terminal 34 of the battery 9. The dynamo 4, as hereinbefore set forth, is now connected for operation as a motor to drive the single-phase motor 6.

When the controller is actuated to its position b, contact finger 105 is disengaged from the segment 117 to deenergize the circuit for the actuating coil of the switch 71, and contact fingers 107, 111 and 113 are bridged by the segments 117 and 118 to establish energizing circuits for the actuating coils of the switches 72, 69 and 68. When the switch 71 is open, the dynamo 4 is disconnected from the battery, because the motor 6 is operating an an induction motor. The switches 68 and 69 being closed, the machines 3 and 4 are connected for parallel operation as generators.

The energizing circuit for the actuating coil of the switch 72 may be traced from the terminal of the battery, through the coil of the switch 72, conductor 130, contact fingers 107 and 106—bridged by the contact segment 117—and conductors 124 and 28, to the negative terminal 27 of the battery 9. Therefore, the contact members a of the switch 72 are closed to connect the rotor winding of the synchronous motor 6 across the battery 9.

The circuit established for the rotor winding 78 of the synchronous motor 4, when the contact members a of the switch 72 are closed, may be traced from the positive terminal 34 of the battery 9, through conductors, 127, the rotor winding 78, the actuating coil of the switch 79 and contact members a of the switch 72, to the negative terminal 27 of the battery 9.

Since the coil of the switch 79 is energized when the rotor winding 78 is connected across the battery, the contact members of the switch 79 will be opened to interrupt the shunt connection across the terminals of the rotor winding 78. The rotor winding being energized with direct current from the battery 9, the motor 6 will operate at synchronous speed.

The energizing circuit for the actuating coil of the switch 68 may be traced from the terminal 34 of the battery 9, through conductors 33, 32 and 31, the actuating coil of switch 68, conductor 129, contact fingers 113 and 106—bridged by contact segments 117 and 118—and conductors 124 and 28, to the negative terminal 27 of the battery 9. This circuit being established, the switch 68 is closed.

Simultaneously, with the establishment of the energizing circuit for the actuating coil of the switch 68, an energizing circuit for the actuating coil of switch 69 is established. The circuit for the actuating coil of switch 69 may be traced from the terminal 34 of the battery 9, through conductor 33, the actuating coil of switch 69, conductor 128, contact fingers 111 and 106—bridged by contact segment 117—and conductors 124 and 28, to the negative terminal 27 of the battery 9. Since the switches 68 and 69 are closed, the generators 3 and 4 are connected for parallel operation.

When the controller is actuated to its position c, the contact fingers 108 to 110, inclusive, and 114 are bridged by the contact segments 117 and 118 to establish energizing circuits for the actuating coils of the switches 86, 54', 54 and 21, respectively.

The circuit for the actuating coil of the switch 86 may be traced from the contact finger 106 through the contact segment 117, contact finger 108, conductor 131 and the coil of the switch 86 to the positive terminal 34 of the battery 9. Therefore, the switch 86 is closed and the exciter generator 8 is connected across the battery 9, through the conductors 28 and 33, for supplying charging current to the battery and direct-current to the coils of the switches embodied in the control system.

The energizing circuit for the coil of the switch 54' may be traced from the battery 9, through conductor 33, the coil of switch 54', conductor 132, contact fingers 109 and 106, bridged by contact segment 117, and conductors 124 and 28, to the battery.

The energizing circuit for the actuating coil of switch 54 may be traced from the energized conductor 33, through the actuating coil of the switch, conductor 133, contact fingers 109 and 106—bridged by contact segment 117—and conductor 124, to the energized conductor 28.

The energizing circuit for the actuating coil of the switch 21 may be traced from the negative terminal 27 of the battery 9, through conductors 28 and 124, contact finger 106, contact segments 117 and 118, contact finger 114, conductor 134, the actuating coil of the switch 21 and conductors 31, 32 and 33, to the positive terminal 34 of the battery 9. The motors 1 and 2 are now connected across the generators 3 and 4 and a low voltage is applied thereto in starting. To increase the voltage developed by the machines 3 and 4, and, consequently, the speed of the motors 1 and 2, the controller is actuated through positions d to g, inclusive, position g being the full-running-speed position.

When the controller is in the position d, energizing circuits are established for the actuating coils of the switches 50 and 63, in position e for the coils of the switches 51 and 64, in position f for the coils of the switches 52 and 65, and in position g for the coils of the switches 53 and 66.

When the switches 63 and 50 are closed, the section 59 of the resistor 58 and the section 46 of the resistor 45 are shunted simultaneously, and the current through the field windings 44 and 57 is increased to effect an increase in the voltage developed by the generators 3 and 4.

The energizing circuit for the actuating coil of the switch 50 may be traced from the positive terminal 34 of the battery 9, through conductor 137, contact fingers 100 and 101— bridged by contact segment 116—conductor 138, the coil of the switch 50 and conductors 139, 140 and 28, to negative terminal 27 of the battery 9. Similarly, a circuit for the actuating coil of the switch 63 may be traced from contact finger 99, through conductor 141, the coil of switch 63, conductors 139, 140 and 28, to the negative terminal 27 of the battery 9. The energizing circuits for the coils of the switches 51 and 64, established when the controller is in position e, may be traced from the contact fingers 102 and 98, through the respective conductors 142 and 143 to the coils of the respective switches 51 and 64. Similarly, the circuits for the actuating coils of switches 52 and 53 and switches 65 and 66 may be traced from the contact fingers 103 and 104, and 97 and 96 through conductors 144, 145, 146 and 147, respectively.

When the vehicle is operating on a track section energized by direct-current, as from the trolley conductor 10, the direct-current section of the controller 12, comprising contact segments 119 to 123, inclusive, may be actuated through its operating positions h to p inclusive.

When the controller is in position h, contact fingers 96 to 100, inclusive, 106 and 108 to 110, inclusive, and 112 are bridged by the contact segments 119 to 123, and energizing circuits for the coils of the switches 63 to 66, inclusive, and switches 54 and 54' and 86 and 90 are established. The circuits for the coils of the switches 63 to 66, inclusive, have been hereinbefore traced, therefore, it is thought unnecessary to trace them. This is true also for the circuits established for the switches 54, 54' and 86.

The energizing circuit for the coil of the switch 90 may be traced from the negative terminal 27 of the battery 9, through conductors 28 and 124, contact fingers 106 and 112—bridged by contact segments 120 and 122—conductor 149, the actuating coil of switch 90 and conductors 31, 32 and 33, to the positive terminal 34 of the battery 9.

The aforesaid switches having been closed, the machine 4 will be connected to the trolley conductor 10 for operation as a motor. The energizing circuit for the motor 4 may be traced from the trolley conductor 10, through the pantograph 84, circuit breaker 82, contact member b of the switch 81, conductors 91 and 92, the resistor 88, the field winding 56, and the armature 55 of the machine 4, conductor 93 and the contact members of the switch 90, to ground at 85. The motor 4 will rotate, and the controller may be actuated to the position I. In this position, contact finger 95 is engaged by the controller segment 119, and an energizing circuit is established for the coil of the switch 89 which is disposed to shunt the resistor 88. This circuit may be traced from the negative terminal 27 of the battery 9, through conductor 140, the actuating coil of switch 89, conductor 151, contact fingers 95 and 100—bridged by the controller segment 119—and conductor 137, to the positive terminal 34 of the battery 9.

If the controller 12 is actuated through positions j, k and l, respectively, the operating coils of the switches 66, 65 and 64 will be deenergized in succession to decrease the current through the field winding 57 in successive steps, because the sections 62, 61 and 60 of the resistor 58 are sequentially reconnected in series-circuit relation with the field winding.

When the controller 12 is in position l, the contact finger 115 thereof is bridged by the controller segment 123, and a circuit for the operating coil of the switch 21 is established. This circuit may be traced from the negative terminal 27 of the battery 9, through conductors 28 and 124, contact fingers 106 and 114 bridged by the segments 120 and 123, conductor 134, through the coil of the switch 21 and conductors 31, 32 and 33, to the positive terminal 34 of the battery 9. This circuit having been established, the switch 21 is closed, and the motors 1 and 2 are connected for operation to the generator 3.

As has heretofore been stated, the speed of the motors 1 and 2 may be increased by increasing the voltage developed by the machine 3. This voltage may be increased by increasing the field strength of the field winding 44 which is accomplished by shunting the respective sections 46 to 49, inclusive, of the resistor 45.

To accelerate the motors 1 and 2 to full running speed, the controller 12 is actuated step-by-step through the positions l to p inclusive. As the controller is moved step-by-step from position l to p, the switches 50 to 53, inclusive, are actuated in sequence to their circuit-closing positions, whereby the sections 46 to 49, inclusive, of the resistor 45 are shunted in sequence. The voltage supplied to the motors 1 and 2 is, therefore, increased step-by-step until full voltage is applied.

When the controller 12 is in position p, the motors 1 and 2 are fully energized and develop full tractive effort at full running speed. While developing full tractive effort, the machine 3 is carrying approximately 100% overload. The motor 4 can be designed to carry this overload for a relatively short period of time without danger of overheating and, if the vehicle is operating over a relatively short section of track supplied with direct current, the motors 1 and 2 may be operated in parallel without damaging the generator 3.

If, however, the section supplied with direct current from the trolley 10 is relatively long, the motors 1 and 2 may be connected in series by actuating the drum controller 11 to the series position as hereinbefore stated.

When operating in series-circuit relation the motors 1 and 2 will develop full tractive effort at approximately one-half speed, but the load delivered by the generator 3 will only be normal full load. The vehicle may, therefore, operate over a track section of indefinite length, under these conditions.

From the foregoing description, it will be seen that the invention contemplates the use of direct-current traction motors for propelling vehicles, irrespective of whether the vehicles are operating with a track section supplied with alternating current or direct current. To provide for both conditions of operation, an alternating-current motor is provided for driving a plurality of dynamo-electric machines which supply direct current to the traction motors when the vehicle is operating on a section of track supplied with alternating current.

A plurality of dynamo-electric machines are provided in order to reduce the size and weight of the equipment required to propel the same vehicle over a track section supplied with direct current. For example, if the dynamos 3 and 4 should be utilized as generators at all times, then, when the vehicle is operating on a track section supplied with direct current, a direct-current motor would be required to drive the machines 3 and 4 as generators. The capacity of this motor would necessarily be approximately equal to the capacity of the combined machines 3 and 4, however, by utilizing one of the dynamo-electric machines as a motor to drive the other as a generator, the direct-current motor referred to may be dispensed with. If the track section supplied with direct current is relatively short, the dynamo operating as a motor to drive the other dynamo as a generator may be overloaded, while propelling the vehicle through this section. If the direct-current track section is relatively long, the motors may be connected in series-circuit relation across the dynamo-electric machine, which is operating as a generator, and it will not be overloaded.

Various modifications of the invention herein disclosed may be made without departing from the spirit and the scope thereof. It is desired, therefore, that only such limitations shall be placed thereon as are imposed by the prior art and the appended claims.

I claim as my invention:

1. In a motor vehicle, in combination, a plurality of traction motors, a plurality of mechanically-connected dynamo-electric machines for supplying direct current to said traction motors, a battery, an alternating-current motor mechanically connected to said machines, means for connecting the battery to one of the dynamo-electric machines to drive it as a motor to start the rotation of the alternating-current motor, a source of alternating-current power, means for disconnecting the battery from the machine and for connecting it to excite the alternating-current motor, means for connecting the alternating-current motor to the source of alternating-current power, a source of direct-current power and means for connecting one of said machines to the direct-current power supply for operation as a direct-current motor for driving the other of said machines as a generator.

2. In a motor vehicle, in combination, a plurality of traction motors, a plurality of mechanically-connected dynamo-electric machines for supplying direct current to said traction motors, an alternating-current motor for driving said dynamo-electric machines, means, including a battery and a starting motor connected thereto, for starting the rotation of the alternating-current motor, a source of alternating-current power, means for connecting the alternating-current motor to the source of alternating-current power, a source of direct-current power and means for connecting one of said machines to the direct-current power supply for operation as a direct-current motor for driving the other of said machines as a generator.

3. In a motor vehicle, in combination, a plurality of traction motors, a plurality of mechanically connected dynamo-electric machines for supplying direct current to said traction motors, an alternating-current motor for driving said dynamo-electric machines, a source of alternating-current power, means for connecting the alternating-current motor to the source of alternating-current power, a source of direct-current power on said motor vehicle, means for connecting one of said machines to the direct-current power supply for operation as a direct-current motor for starting the rotation of the alternating-current motor, a second source of direct-current power and means for connecting one of said machines to the second source of direct-current power for operation as a direct-current motor for driving the other of said machines as a generator.

In testimony whereof, I have hereunto subscribed my name this 3rd day of January, 1929.

NORMAN W. STORER.